United States Patent [19]

Broadbent

[11] Patent Number: 4,758,621

[45] Date of Patent: Jul. 19, 1988

[54] PERSULFATE ACTIVATED AUTODEPOSITION BATH

[75] Inventor: Ronald W. Broadbent, Ardsley, Pa.

[73] Assignee: Amchem Products, Inc., Ambler, Pa.

[21] Appl. No.: 544,450

[22] Filed: Oct. 21, 1983

Related U.S. Application Data

[63] Continuation of Ser. No. 327,677, Dec. 4, 1981, abandoned, which is a continuation-in-part of Ser. No. 102,834, Dec. 12, 1979, abandoned.

[51] Int. Cl.$^4$ .............................................. C08L 9/08
[52] U.S. Cl. .................................... 524/575; 148/6.2; 427/435
[58] Field of Search .................... 524/575; 148/6.2; 427/435

[56] References Cited

U.S. PATENT DOCUMENTS 4,160,756 7/1979 Nishida ............................... 427/435
4,191,676 3/1980 Hall ..................................... 427/435

FOREIGN PATENT DOCUMENTS 147738 12/1978 Japan .

*Primary Examiner*—Paul R. Michl
*Attorney, Agent, or Firm*—Alexis Barron

[57] ABSTRACT

An aqueous autodepositing coating composition for coating metallic surfaces comprising resin, persulfate and, optionally, fluoride, which is effective in coating at a pH of about 4 to about 8.5.

1 Claim, No Drawings

PERSULFATE ACTIVATED AUTODEPOSITION BATH

CROSS REFERENCE TO RELATED APPLICATION

This application is a continuation of application Ser. No. 327,677, filed Dec. 4, 1981, abandoned, which is a continuation-in-part of Ser. No. 102,834, filed Dec. 12, 1979, now abandoned.

FIELD OF THE INVENTION

This invention relates generally to autodeposition compositions and methods, and, more particularly, to an improved autodepositing composition which is effective at neutral or near-neutral pH.

BACKGROUND OF THE INVENTION

So-called "autodepositing coating" compositions, which first appeared in the patent literature in the early 1970's, are compositions that are effective in forming on a metallic surface immersed therein an organic coating which increases in thickness as a function of the length of time the surface ("substrate") is immersed in the composition ("bath") in the absence of an externally-applied electrical potential. By way of illustration, autodepositing coating compositions and methods of autodeposition are disclosed in U.S. Pat. Nos. 3,585,084; 3,592,699; 3,776,848; 3,791,431; 3,795,546; 3,829,371; 3,839,097; 3,914,519; 3,936,546; 3,955,532; 3,960,610; 4,012,351; 4,030,945; 4,103,049; 4,104,424; and 4,103,817. The prior art autodepositing compositions are generally employed at a pH of between about 1.6 and about 3.8.

The present autodepositing coating composition differ from the above-mentioned prior art compositions inasmuch as the present compositions contain persulfate and are capable of autodepositing coating in a pH range of from about 4 to about 8.5, thereby making autodeposition possible at neutral or near-neutral pH's.

SUMMARY OF THE INVENTION

In one aspect, the present invention relates to an aqueous autodepositing coating composition that is effective in coating ferrous surfaces within a composition pH range of between about 4 and about 8.5. The composition comprises (A) resin selected from the group consisting of water-soluble, water-solubilized, water-dispersed and water-emulsified resins and (B) persulfate ion. In addition, the composition of the invention can optionally contain fluoride which acts as an accelerator for the persulfate ion in the autodeposition process.

In another aspect, the present invention relates to a method of autodepositing coating on ferrous surfaces comprising immersing said surfaces in the above-described coating composition.

Although the theory behind the effectiveness of the present invention is not completely understood, it is thought that the persulfate ion acts within the pH range of about 4 to about 8.5 to etch the substrate, thereby producing metal ions, and that the thus dissolved substrate metal ions destabilize the resin in the region of the substrate surface, thereby producing an autodeposited coating. By virtue of the present invention, the autodeposition phenomenon can be achieved at a pH range heretofore thought impossible, that is, at neutral or near-neutral pH. The preferred combination of persulfate and fluoride allows for the formation of greater coating thicknesses over shorter immersion times than is experienced with compositions containing persulfate, but not fluoride.

DETAILED DESCRIPTION OF THE INVENTION

The compositions of the present invention contain one or more water-soluble, water-solubilized, water-dispersed or water-emulsified organic coating forming resins. Such resins include the epoxy resins and polymeric film-forming materials such as polyethylene, polyacrylic and styrene-butadiene co-polymers and polymers. By way of example, the epoxy resins (such as EPON resins, products of Shell Chemical Co.) can be emulsified with toluene to produce a water-emulsified epoxy resin. A particularly useful class of resins is the resin dispersion class known as "latices" which includes, for example, the styrene-butadiene latex, DAREX 637, manufactured by W. R. Grace & Co., butyl latex, vinylidene chloride latex, vinyl acetate latex, and ethylene-vinyl acetate copolymer latex.

The amount of resin utilized can vary over a wide range. The lower concentration limit is dictated by the amount of coating needed to provide sufficient material to form a coating. The upper limit is dictated by the amount of material that can be dispersed, dissolved or emulsified in the coating composition. Preferably, the composition contains from about 5 to about 550 (more preferably from about 50 to about 200) grams/liter.

Persulfate is preferably added as a salt thereof in an amount sufficient to provide from about 1 to about 20 grams/liter of persulfate ion in the coating composition. Preferably, the persulfate ion is added to the composition as ammonium persulfate in view of the fact that ammonium ion does not interfere with the coating process. In contrast, it has been found that other ions such as sodium and potassium ions can interfere with the autodeposition process for some latex resins, in which case, an ion exchange step to remove the potassium or sodium from the coating composition may be required.

Fluoride, which is optionally, but preferably used, is preferably added as a salt thereof in an amount sufficient to provide from about 1 to about 10 grams/liter of fluoride in the coating composition. The fluoride is most preferably added to the composition as ammonium fluoride.

The use of fluoride, which acts as an accelerator for the persulfate ion thereby increasing film build and the rate thereof, results in an autodeposited film or coating that is found to be more cohesive when wet, and more adhesive to the substrate than films formed from a persulfate coating composition that does not contain fluoride. This increased cohesiveness when wet increases the resistance of a newly autodeposited film to physical disruption when water-rinsed.

The combination of fluoride and persulfate ion permits the use of lesser amounts of persulfate ion than are required in the absence of fluoride. Use of a lesser amount of persulfate ion appears to increase the corrosion resistance of the autodeposited film.

The coating compositions of the present invention are employed at a preferred pH of from about 6 to about 8. While the compositions may be employed to form coatings at a pH as high as 8.5 or as low as about 4, there are many important advantages that are achieved by operation at neutral or near-neutral pH.

The rate of coating formation is higher and the cohesiveness of the film, and thus its ability to resist water rinsing, is higher when operating within the preferred pH range.

By operating within the pH range of about 6 to about 8, acid-sensitive dyes and pigments, including anti-corrosive pigments such as those manufactured by Halox Pigments, a division of Hammond Lead Products, Inc., may be used. Various dyes and pigments are known to be acid-sensitive. These acid-sensitive dyes and pigments, including ones which are anti-corrosive, and the use thereof results in autodeposited coatings that have improved corrosion resistance. In addition, lead chromate, which is an anticorrosive pigment and is also acid-sensitive, may be effectively employed.

Another advantage that can be realized by the practice of this invention at a neutral or near-neutral pH is that inorganic fillers and extenders which are acid-sensitive can be included in the composition. Calcium carbonate is an example of such a material.

Yet another advantage is that acid-sensitive resins or latices can be used. For example, resins which hydrolyze in acid medium can be used. Examples of such resins include vinyl ester polymers and vinyl ester copolymers such as vinyl acetate and ethylene-vinyl acetate copolymer.

Styrene-butadiene latices may be effectively employed at neutral or near-neutral pH.

Additional advantages to be realized by operating at neutral or near-neutral pH include the obvious health and safety benefits and the ability to use industrial equipment which is not highly acid-resistant.

The present compositions may be formulated to have a pH within the range of about 6 to about 8 by adjusting the relative amounts of the essential ingredients. Therefore, it is not necessary to add any pH-adjusting compounds such as hydrochloric acid or sulfuric acid to the present compositions, which acids are known to be detrimental to corrosion resistance. Such pH-adjusting agents may of course be added but their use is generally not preferred. If it is desired to add such agents, it is preferred to adjust the pH by the addition of hydrofluoric acid or ammonium hydroxide since the addition thereof will not introduce ions to the solution which are deleterious to the effectiveness thereof. It is generally preferred, however, that the compositions of the present invention be free of all such added pH-adjusting agents.

The substrate to be immersed in the present compositions in order to autodeposit a coating thereon may be any ferriferous or zinciferous substrate such as, for example, cold-rolled steel, mild steel, iron, galvanized steel, and the like.

Ferrous substrates are coated according to the autodeposition method of the present invention by immersing the substrate to be coated in a bath of the present composition, at a composition temperature of from about 20° C. to about 40° C. for a time sufficient to autodeposit a coating thereon of the thickness desired. As is well known in the autodeposition field, coating weight, for a particular coating composition and type of metal surface, tends to increase as the immersion time is increased. Generally, immersion times will vary from about 30 seconds or less to about 10 minutes or more.

Since the persulfate ion is known to decompose at a rate which increases with increasing temperature, the compositions should be employed within the above-mentioned temperature range. It is preferred to employ the compositions of the present invention at a temperature of from about 20° C. to about 30° C.

Other ingredients can be added in minor amounts to the instant coating compositions, such as, for example, coalescing agents (e.g., ethylene glycol monobutyl ether or butyl carbitol acetate), pH-adjusting agents such as those discussed above, and various dyes and pigments (including the preferred, above-mentioned anticorrosive pigments), such as titanium dioxide or AQUABLAK 115, a carbon black dispersion product of Borden Chemical Co.

EXAMPLE 1

Several autodepositing coating compositions were prepared by mixing DAREX 637 styrene-butadiene latex with deionized (D.I) water and adding ammonium persulfate. The latex was diluted with water to the precent weight/volume solids specified in Table I below to make 1 liter of bath. To the 1 liter of bath was added ammonium persulfate in the amount specified in Table I to make autodepositing compositions.

Unpolished cold-rolled steel Q-panels (3"×4") were immersed for periods of 1 minute, 3 minutes or 5 minutes in the above compositions. After immersion in the compositions, the coating thickness ("film-build") was measured in mils. The results are given in Table 1 which follows.

TABLE 1

| Coating Composition | | | | |
|---|---|---|---|---|
| resin, % solids weight/volume | ammonium persulfate (grams/liter) | pH | Substrate immersion time (minutes) | Coating thickness (mils) |
| 5 | 3 | 6.92 | 1 | .05–.15 |
| 5 | 3 | 6.92 | 3 | .3–.4 |
| 5 | 3 | 6.92 | 5 | .45–.55 |
| 5 | 5 | 6.35 | 1 | .25–.35 |
| 5 | 5 | 6.35 | 3 | .50–.60 |
| 5 | 5 | 6.35 | 5 | .60–.70 |
| 20 | 3 | 7.47 | 1 | .10–.15 |
| 20 | 3 | 7.47 | 3 | .10–.20 |
| 20 | 3 | 7.47 | 5 | .20–.90 |
| 20 | 5 | 7.20 | 1 | .10 |
| 20 | 5 | 7.20 | 3 | .7–1.1 |
| 20 | 5 | 7.20 | 5 | 1.4–1.6 |

The results as presented in Table 1 show that the film thickness that is achievable can vary considerably depending upon the substrate immersion time used, the percent resin solids used, and the quantity of ammonium persulfate used. It should be noted that a 5% weight/volume of resin solids using the DAREX 637 latex represents about 200 grams/liter resin solids. DAREX 637 latex includes an anionic surfactant, and the surfactant concentration of the latex is below the critical miscelle concentration (CMC).

EXAMPLE 2

Autodepositing coating compositions were prepared from 180 grams of DAREX 637 and 5 grams of AQUABLAK 115 (a carbon black pigment dispersion) which were placed in a 1 liter beaker. The resulting mixture was diluted with D.I. water to a volume of a 1 liter.

To one liter samples of the above composition was added ammonium persulfate in the amounts specified in Table 2 below.

Unpolished cold-rolled steel Q-panels (3"×4") were immersed for 60 seconds in these compositions in order to determine the etch rate of substrate metal in mg/sq. ft.-min. In addition, Q-panels were immersed for 90 seconds in each composition in order to determine coating thickness. The results are presented in Table 2 below.

TABLE 2

|  | Ammonium Persulfate Added (grams/liter) | pH of Composition | Etch Rate (mg./sq. ft.-min.) | Coating Thickness (mils) for 90 sec. immersion |
| --- | --- | --- | --- | --- |
| Run A | 2 | 7.65 | 8.8 | 0–0.5 |
| Run B | 3 | 7.49 | 18.8 | 0.5–0.6 |
| Run C | 4 | 7.35 | 18.4 | 0.5–0.6 |
| Run D | 5 | 7.22 | 25.2 | 0.7–0.8 |
| Run E | 6 | 7.05 | 26.0 | 0.8–1.0 |

The results as presented in Table 2 show that both substrate metal etch rate and autodeposited coating thickness increased in direct proportion to the quantity of persulfate in the coating composition.

EXAMPLE 3

An autodepositing coating composition identical to Run A of Example 2, except for the inclusion of 7.5 grams/liter of $NH_4F$, was prepared in accordance with the procedure given in Example 2. The pH of the resulting composition was 7.2.

A Q-panel was coated in accordance with the procedure of Example 2. The composition provided an etch rate of 18.6 mg/sq.ft-min. and a coating thickness of 0.5–0.6 mil for a 60-second panel immersion and 0.6–0.7 mil for a 90-second immersion. Thus, for a 90-second immersion, coating thickness was improved from 0–0.5 (see Table 2) to 0.6–0.7 by the addition of the $NH_4F$.

In summary, it can be said that the present invention enables one to formulate a coating composition which is effective over a broad pH range, including an acidic pH, a neutral pH, and a basic pH. This in turn gives the user the advantage of being able to select from a wide variety of materials constituents that are particularly effective in the composition at the pH at which it is operated.

I claim:

1. An aqueous basic coating composition which is effective in forming an autodeposited coating on a metallic surface and consisting essentially of: (A) dispersed resin solids, (B) persulfate, and (C) fluoride; and having a pH in excess of 7 and not in excess of about 8.5.

* * * * *